(12) United States Patent
Gao et al.

(10) Patent No.: US 11,474,919 B2
(45) Date of Patent: Oct. 18, 2022

(54) METHOD FOR MANAGING MULTIPLE DISKS, ELECTRONIC DEVICE AND COMPUTER PROGRAM PRODUCT

(71) Applicant: EMC IP Holding Company LLC, Hopkinton, MA (US)

(72) Inventors: Jian Gao, Beijing (CN); Hongpo Gao, Beijing (CN); Lei Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 440 days.

(21) Appl. No.: 16/591,890

(22) Filed: Oct. 3, 2019

(65) Prior Publication Data
US 2020/0133810 A1 Apr. 30, 2020

(30) Foreign Application Priority Data
Oct. 31, 2018 (CN) .......................... 201811289047.9

(51) Int. Cl.
*G06F 11/10* (2006.01)
*G06F 11/20* (2006.01)
*G06F 3/06* (2006.01)

(52) U.S. Cl.
CPC ........ *G06F 11/2094* (2013.01); *G06F 3/0619* (2013.01); *G06F 3/0659* (2013.01); *G06F 3/0689* (2013.01); *G06F 11/1088* (2013.01); *G06F 11/1092* (2013.01); *G06F 2201/82* (2013.01)

(58) Field of Classification Search
CPC .. G06F 11/1092; G06F 3/0619; G06F 3/0689; G06F 11/1088; G06F 2201/82
See application file for complete search history.

(56) References Cited

U.S. PATENT DOCUMENTS

| 7,418,623 | B2 | 8/2008 | Elliott et al. |
| 9,910,748 | B2 | 3/2018 | Pan |
| 9,921,912 | B1* | 3/2018 | Vankamamidi ..... G06F 11/1092 |
| 10,007,432 | B2 | 6/2018 | Atluri et al. |
| 10,082,965 | B1* | 9/2018 | Tamilarasan .......... G06F 3/0616 |
| 10,891,066 | B2 | 1/2021 | Darisa et al. |
| 2006/0277380 | A1* | 12/2006 | Sicola ................... G06F 3/0689 711/165 |
| 2009/0177918 | A1* | 7/2009 | Abali ................. G06F 11/1092 714/E11.122 |
| 2010/0169575 | A1* | 7/2010 | Masaki ............... G06F 11/2094 711/E12.001 |

(Continued)

*Primary Examiner* — Yolanda L Wilson
(74) *Attorney, Agent, or Firm* — BainwoodHuang

(57) ABSTRACT

Techniques involve: detecting whether a first set of disks include an inaccessible disk, respective disk sections in the first set of disks forming a first set of stripes; in response to detecting the first set of disks including the inaccessible disk, determining faulty stripes in the first set of stripes, the faulty stripes including a first number of inaccessible disk sections; and in response to the first number exceeding a second number of free sections of the first set of disks, moving data in at least one stripe in the first set of stripes to free sections of the second set of disks to release sections of the at least one stripe, respective disk sections in the second set of disks forming a second set of stripes, each stripe in the first set of stripes and the second set of stripes having the same number of sections.

18 Claims, 8 Drawing Sheets

(56) References Cited

U.S. PATENT DOCUMENTS

| | | | |
|---|---|---|---|
| 2014/0215262 A1* | 7/2014 | Li | G06F 11/0727 |
| | | | 714/6.21 |
| 2019/0004899 A1* | 1/2019 | Gao | G06F 11/1088 |
| 2020/0133778 A1* | 4/2020 | Liu | G06F 11/1092 |
| 2021/0334183 A1* | 10/2021 | Gao | G06F 3/0619 |

* cited by examiner

METHOD FOR MANAGING MULTIPLE DISKS, ELECTRONIC DEVICE AND COMPUTER PROGRAM PRODUCT

CROSS-REFERENCE TO RELATED APPLICATION

This application claims priority to Chinese Patent Application No. CN201811289047.9, on file at the China National Intellectual Property Administration (CNIPA), having a filing date of Oct. 31, 2018, and having "METHOD FOR MANAGING MULTIPLE DISKS, ELECTRONIC DEVICE AND COMPUTER PROGRAM PRODUCT" as a title, the contents and teachings of which are herein incorporated by reference in their entirety.

FIELD

Embodiments of the present disclosure relate to the field of data storage, and more specifically to a method for managing disks, an electronic device and a computer program product.

BACKGROUND

The redundant Array of Independent Disks (RAID) technology is a data storage virtualization technology that is usually used to provide multiple properties such as data redundancy and performance improvements. The RAID writes and reads data in unit of stripe. Some traditional RAIDs evenly write data at the disk level.

With the development of RAID technology, RAID performs data reading and writing at a disk section level rather than at the disk level. Specifically, each of the plurality of disks is divided into a plurality of sections. The RAID combines sections of different disks into a RAID stripe and reads or writes data to them using a RAID algorithm. Usually, RAID reserves some sections in multiple disks as spare space to handle occurrence of failure. In this way, when a disk fails, the data of the failed disk may be rebuilt into the spare space, thereby avoiding the loss of user data.

At present, the reservation management of the spare space has a problem of inefficiency, which leads to waste of disk storage resources, and therefore, a more optimized spare space reservation management scheme is still needed.

SUMMARY

Based on the above problems, a solution for managing disks is provided according to example embodiments of the present disclosure.

In a first aspect of the present disclosure, there is provided a method for managing disks. Specifically, the method includes: detecting whether a first set of disks of a storage system include an inaccessible disk, respective sections of a plurality of disks in the first set of disks forming a first set of stripes; in response to detecting that the first set of disks include the inaccessible disk, determining faulty stripes in the first set of stripes, the faulty stripes including a first number of sections of the inaccessible disk; and in response to the first number exceeding a second number of free sections of the first set of disks, moving data in at least one stripe in the first set of stripes to free sections of a second set of disks of the storage system to release sections of the at least one stripe, respective sections of a plurality of disks in the second set of disks forming a second set of stripes, each stripe in the first set of stripes and the second set of stripes having the same number of sections.

In a second aspect of the present disclosure, there is provided an electronic device. The electronic device includes: a processor; and a memory coupled to the processor, the memory having instructions stored therein which, when executed by the processor, cause the electronic device to perform acts of: detecting whether a first set of disks of a storage system include an inaccessible disk, respective sections of a plurality of disks in the first set of disks forming a first set of stripes; in response to detecting that the first set of disks include the inaccessible disk, determining faulty stripes in the first set of stripes, the faulty stripes including a first number of sections of the inaccessible disk; and in response to the first number exceeding a second number of free sections of the first set of disks, moving data in at least one stripe in the first set of stripes to free sections of a second set of disks of the storage system to release sections of the at least one stripe, respective sections of a plurality of disks in the second set of disks forming a second set of stripes, each stripe in the first set of stripes and the second set of stripes having the same number of sections.

In a third aspect of the present disclosure, there is provided a computer program product. The computer program product is tangibly stored on a computer readable medium and includes computer executable instructions which, when executed, causes a device to perform the method according to the first aspect of the present disclosure.

It will be appreciated that the contents as described in the Summary are not intended to identify key features or essential features of the embodiments of the present disclosure, nor are they intended to be used to limit the scope of the present disclosure. Other features of the present disclosure will be made apparent by the following description.

BRIEF DESCRIPTION OF THE DRAWINGS

Through the following detailed description with reference to the accompanying drawings, the above and other features, advantages and aspects of various embodiments of the present disclosure will become more apparent. Throughout the drawings, the same reference symbols generally refer to the same elements, wherein.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Implementations of the present disclosure will now be described in detail with reference to the accompanying drawings. Although the drawings illustrate some implementations of the present disclosure, it would be appreciated that the present disclosure may be implemented in various manners but cannot be construed as being limited by the embodiments illustrated herein. Rather, these embodiments are provided to disclose the present disclosure more thoroughly and completely. It would be appreciated that the drawings and embodiments are provided only as examples, without any intention of limiting the protection scope of the present disclosure.

In the description about embodiments of the present disclosure, the term "includes" and its variants are to be read as open-ended terms that mean "includes, but is not limited to." The term "based on" is to be read as "based at least in part on." The term "an embodiment/implementation" or "the embodiment/implementation" is to be read as "at least one embodiment/implementation." The terms "first," "second," and the like may refer to different or the same objects. Other definitions, either explicit or implicit, may be included below.

Figure 1:
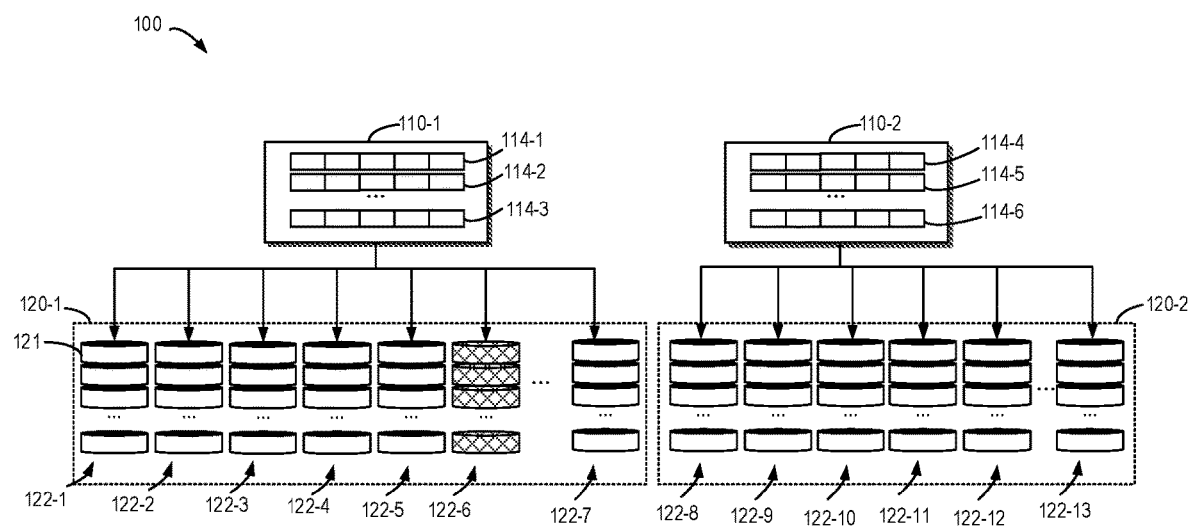
FIG. 1 illustrates a schematic diagram of a storage system in which embodiments of the present disclosure can be implemented.

FIG. 1 illustrates a schematic diagram of a storage system in which embodiments of the present disclosure may be implemented. The system 100 includes multiple physical disks 122-1, 122-2, ..., 122-13 for providing physical storage space. These disks may be collectively referred to or referred to individually as disk 122. The disk 122 may be a variety of persistent disks. For example, the disk 122 may include, but is not limited to, a digital versatile disk (DVD), a Blu-ray disk (BD), a compact disk (CD), a floppy disk, a hard disk, a tape drive, an optical drive, a solid state memory device (SSD), and so on. Each of the disks 122 may be divided into a plurality of sections or a plurality of slices 121. Each section or each slice 121 has a fixed storage capacity. RAID may combine sections or slices 121 on different disks into a RAID stripe 114, which may include stripes 114-1, 114-2, ..., 114-6. For example, RAID may form a stripe 114-3 of RAID 5 on respective sections 121 of disks 122-1, 122-2, 122-3, 122-4, and 122-5.

The RAID can use all of the disks 122 in the storage system to form a queue of RAID stripes and export the storage to a mapping layer (not shown) of the storage system. Correspondingly, the mapping layer maps the logical storage to the physical storage which is allocated from the RAID. Specifically, the mapping layer defines physical blocks, which are the smallest allocation units of the RAID stripe 114 and have a fixed size. When the free physical blocks are insufficient, the mapping layer will require the RAID to allocate a new RAID stripe 114. Then, the mapping layer then allocates the physical blocks from the new RAID stripe 114. As an example, when the size of the section or slice is 4 GB, the size of a RAID stripe 114 at the level RAID 5 is 16 GB; if the size of the physical block is 8 MB, 2048 physical blocks may be allocated from one RAID stripe 114. However, the above is merely an example. The sections and physical blocks in the storage system 100 may also be of other sizes, and the RAID stripes in the storage system 100 may be a RAID stripe at any level.

In addition, the mapping layer of the storage system may perform a restripe operation. Specifically, the mapping layer may copy the data on the existing RAID stripe 114 to the new RAID stripe, and after the copying is completed, the mapping layer demaps and releases the existing RAID stripe. The mapping layer may also perform a stripe rebuilding operation. Specifically, when a disk in the storage system fails, the mapping layer may fix or rebuild data on the sections of the failed disk on the new sections or slices using the remaining data on the RAID stripe.

To ensure RAID reliability, it is generally desirable to allocate sections or slices for a RAID stripe in a limited number of disks. The defined number of disks form a set of disks. If the number of disks in the system exceeds a defined number, another set of disks may be subdivided. That is, the storage system 100 divides the multiple disks into one set or sets according to the number of disks, and the sections in the same RAID stripe 114 are all from the same set of disks. Thus, the number of disks in such a set of disks should meet a minimum number of disks required to establish the RAID strip. In addition, the number of disks in such a set of disks cannot be too high, which leads to an increase in the probability of occurrence of a defective disk, thereby reducing reliability. As shown in FIG. 1, multiple physical disks 122-1, 122-2, ..., 122-13 in the system 100 are divided into a first set of disks 120-1 and a second set of disks 120-2. The RAID forms a first set of stripes 110-1 with the sections in the first set of disks 120-1, and forms a second set of stripes 110-2 with the sections of the second set of disks 120-2. The first set of stripes 110-1 include stripes 114-1, 114-2, ..., 114-3, and the second set of stripes 110-2 include stripes 114-4, 114-5, ..., 114-6.

In some cases, when a disk in a set of disks fails (e.g., disk 122-6 fails), a stripe rebuilding operation may be performed to rebuild user data in free sections. In order to ensure that there are enough free sections for rebuilding user data, it is usually necessary to reserve some free sections in each set of disks as spare space. If a disk in a set of disks fails, a stripe rebuilding operation may be performed to rebuild user data in the sections that serves as the spare space. Therefore, the spare space in a set of disks should be sufficient to rebuild data for the entire failed disk. However, this means that it is almost necessary to reserve the number of sections of one entire disk in each set of disks as spare space. These sections, which serve as spare spaces, cannot be allocated by RAID during normal operation to establish RAID stripes to store user data, but may only be used to rebuild data. It should be appreciated that the free sections mentioned herein may include reserved sections serving as a spare space, and may also include unused sections which do not form a RAID stripe.

However, in some cases, this conventional method of reserving spare space has significant problems. For example, suppose the maximum number of disks in each set of disks is limited to 25 and the minimum number of disks is limited to 6, when there are 26 disks in the storage system, 26 disks will be divided into two sets of disks, and two sets of disks each have 13 disks; or, when there are 24 disks in the storage system and the user will insert 3 new disks, it is necessary to separate some of the disks from the existing set of disks to allow these separated disks and the inserted new disks to form a new set of disks, whereby the existing set of disks and the new set of disks have 21 disks and 6 disks, respectively. In both cases, according to the conventional method, the two sets of disks need to totally reserve sections of two disks as spare space, which is too wasteful of storage space, and the new disks inserted by the user after spending money do not increase the expected storage space.

According to an embodiment of the present disclosure, an improved solution of managing multiple of disks is proposed. The solution of the present disclosure provides for sharing free sections or spare space between two sets of disks for data rebuilding at the time of failure. When a faulty disk occurs in a set of disks, a restripe operation is performed between the two sets of disks, thereby releasing more free sections for a set of disks in which the failed disk is present, and the released free section may participate in the data rebuilding. In this way, free sections or the spare space between the two sets of disks is shared, which reduces the storage resources for the spare space and improves the utilization of the storage space.

Figure 2:
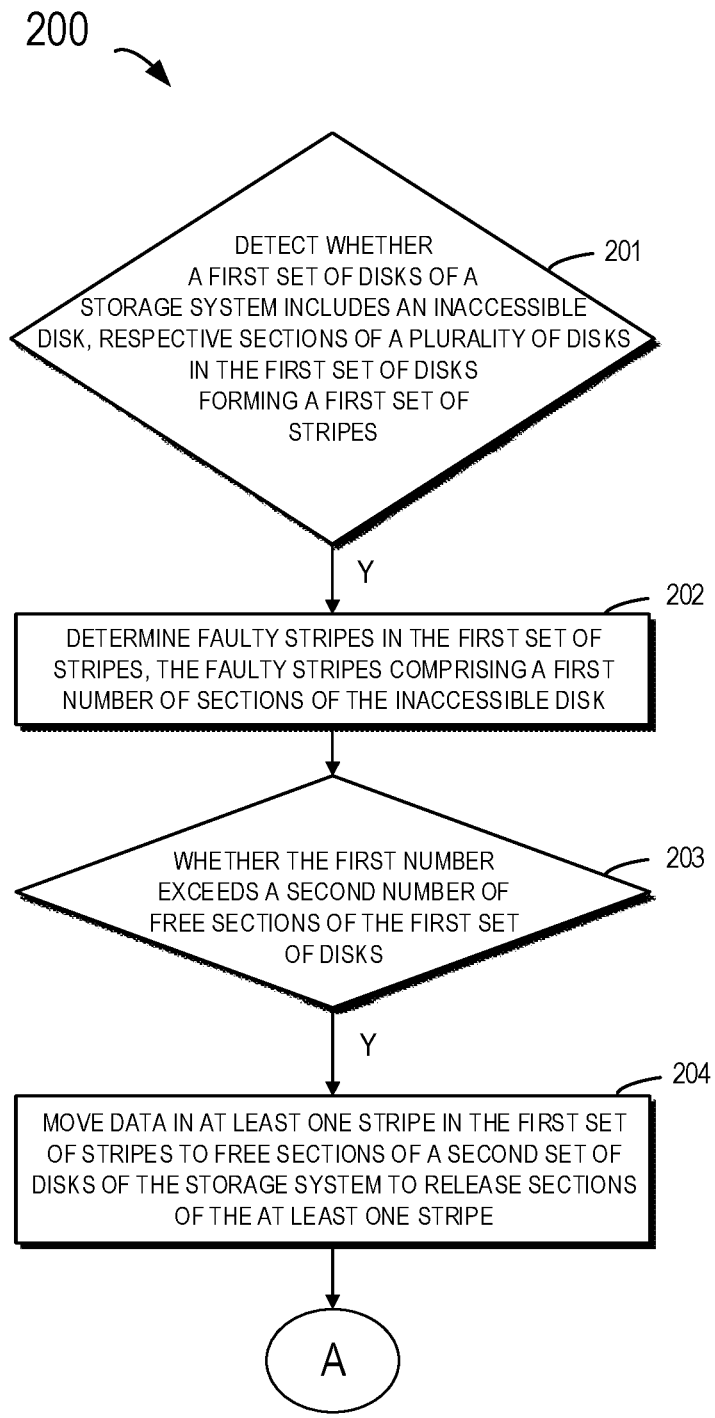
FIG. 2 illustrates a flowchart of a method of managing disks in accordance with an embodiment of the present disclosure.

Embodiments of the present disclosure are described in detail below with reference to the accompanying drawings. FIG. 2 illustrates a flowchart of a method 200 for managing disks in accordance with an embodiment of the present disclosure. Method 200 may be implemented in the storage system 100 in FIG. 1 and executed by a processor. For purpose of discussion, method 200 will be described with reference to FIG. 1.

At block 201, it is detected whether there is an inaccessible disk in the first set of disks 120-1 of the storage system 100, and respective sections of the plurality of disks 122-1, 122-2, . . . , 122-7 in the first set of disks 120-1 form the first set of stripes 110-1.

As shown in FIG. 1, the first set of disks 120-1 include a plurality of disks 122-1, 122-2, . . . , 122-7, and the respective sections of the different disks in a plurality of disks 122-1, 122-2, . . . , 122-7 may form stripes 114-1, 114-2, . . . , 114-3 in the first set of stripes 110-1, and these stripes may be provided to store user data. When a disk in the storage system 100 fails or is taken out, it will cause the data on the failed disk to be inaccessible to the user and the failed disk to become an inaccessible disk. Since the sections forming the first set of stripes 110-1 may include sections on the failed disk, this might cause the loss of data of part of the stripes in the first set of stripes 110-1. Therefore, it is necessary to detect whether there is an inaccessible faulty disk in the storage system 100 in order to rebuild the lost data in time. Specifically, when a certain disk of a set of disks of the storage system 100 (e.g., a disk in the first set of disks 120-1) fails or is taken out, this will be detected. If it is detected that the first set of disks 120-1 has an inaccessible disk (e.g., disk 122-6 has failed), method 200 proceeds to block 202.

At block 202, a faulty strip in the first set of stripes 110-1 is determined, the faulty stripe including a first number of sections of the inaccessible disk.

Specifically, as described above, respective sections of the plurality of disks 122-1, 122-2, 122-6, 122-7 of the first set of disks 120-1 may form a first set of stripes 110-1. A portion of the stripes of the first set of stripes 110-1 might include sections of the inaccessible disk 122-6. This portion of the stripes becomes a failure stripe. However, the data on the faulty stripe is not completely lost. Lost or corrupted data may be calculated by data in other sections belonging to a normal disk on the faulty stripe, and data is rebuilt in free sections of the first set of disks 120-1. Thus, it is necessary to determine which the faulty stripes are. In addition, the number of faulty stripes needs to be determined in order to determine the number of sections of the inaccessible disk 122-6 included in the faulty stripes.

In some embodiments of the present disclosure, determining the faulty stripes in the first set of stripes 110-1 includes determining a set of stripes associated with the inaccessible disk, and determining a stripe stored with user data in the set of stripes as a faulty stripe.

Specifically, as previously described, when the free physical blocks are insufficient, the mapping layer will require the RAID to allocate a new stripe 114. There is no user data on the new stripe before the mapping layer allocates the physical block from the new stripe 114. By reading the metadata of the physical block, the mapping layer may determine which stripes have user data and which stripes have no user data. For stripes without user data, there is no need to consider whether data loss or corruption occurs. Therefore, if the stripe associated with the inaccessible disk does not store user data, it is possible not to determine it as the faulty stripe, but possible to determine a stripe associated with the inaccessible disk and storing the user data as the faulty stripe. In this way, it is possible to effectively avoid unnecessary operations of the system and waste of processor resources.

If the faulty stripes in the first set of stripes 110-1 are determined and the number of sections of the inaccessible disk 122-6 included in the faulty stripes is determined as the first number, the method 200 proceeds to block 203.

At block 203, it is determined whether the first number exceeds a second number of free sections of the first set of disks 120-1.

Specifically, since it is necessary to rebuild the lost or corrupted data in the inaccessible disk with the free sections in the first set of disks 120-1, it needs to be determined whether the current number of free sections can satisfy the data rebuilding. The free sections in the first set of disks 120-1 may include reserved free sections and sections which do not form a stripe. The reserved free section will be described in detail later.

If the number of free sections in the first disk set 120-1 is the second number, and the first number does not exceed the second number, this indicates that the free section in the current first disk set 120-1 are sufficient to rebuild lost or corrupted data in failed disk 122-6. Subsequently, the data in the faulty strip will be rebuilt directly in the free section of the first set of disks 120-1. Specifically, the data in the section belonging to the failed disk 122-6 may be calculated using the data in the sections belonging to a normal disk in the faulty strip. The data is then stored to the free section of the first set of disks 120-1 to complete the data rebuilding or fixing. If the first number exceeds the second number, this indicates that the number of free sections in the current first disk set 120-1 is less than the number of sections required to rebuild the data, which causes inability to complete the rebuilding operation. At this point, method 200 will proceed to block 204.

At block 204, data in at least one stripe of the first set of stripes 110-1 is moved to free sections of the second set of disks 110-2 of the storage system 100 to release sections of at least stripe in the first set of stripes 110-1. Respective sections of the plurality of disks 122-8, 122-9, . . . , 122-13 in the second set of disks 110-2 form a second set of stripes 110-2, and each stripe in the first set of stripes 110-1 and the second set of stripes 110-2 has the same number of sections.

Figure 4A:
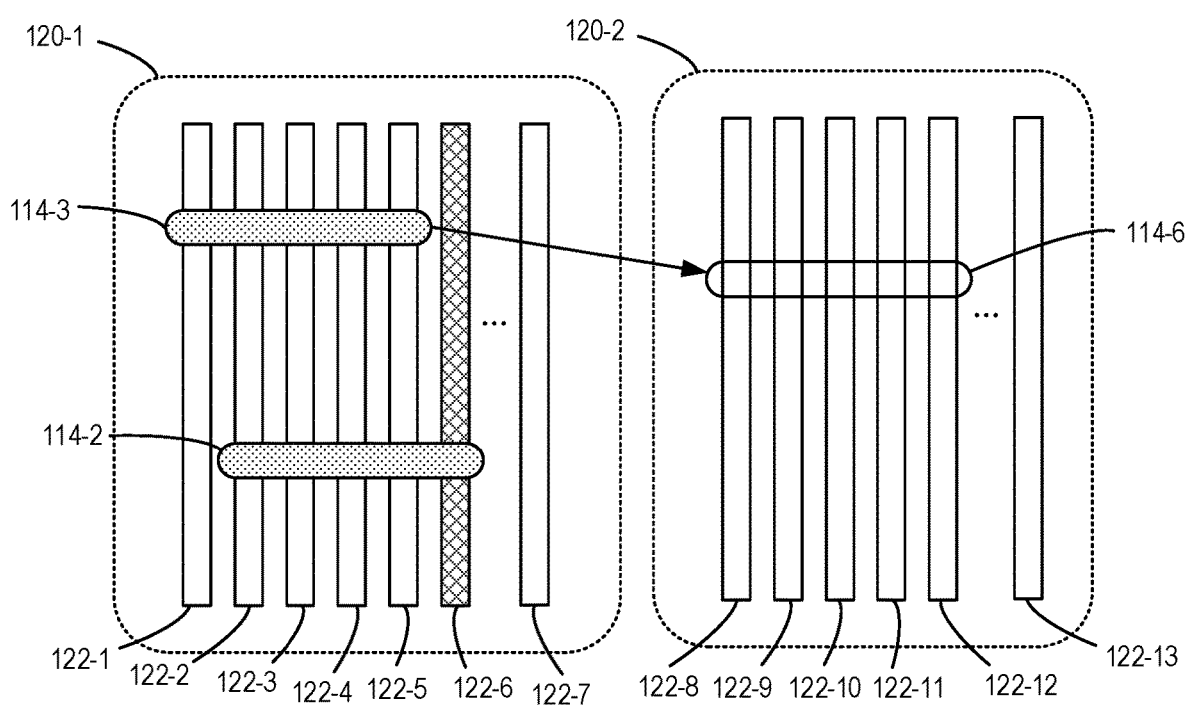
FIG. 4A illustrates a schematic diagram of moving data from stripes of a first set of disks to stripes of a second set of disks.

Block 204 will be described below with reference to FIG. 4A. FIG. 4A illustrates a schematic diagram of data movement from the first set of disks 110-1 to the second set of disks 110-2.

By way of example only, as shown in FIG. 4A, respective sections of the disks 122-1, 122-2, 122-3, 122-4, and 122-5 of the first set of disks 120-1 form a stripe 114-3, and respective sections of the disks 122-2, 122-3, 122-4, 122-5, and 122-6 of the first set of disks 120-1 form a stripe 114-2. For the sake of clarity, FIG. 4A and FIGS. 4B and 4C mentioned later do not show all stripes in the first set of stripes 110-1, but for simplicity and by way of example show the stripes 114-2 and 114-3. Merely by way of example, the RAID level of each stripe in the storage system 100 is RAID5.

In FIG. 4A, it is detected that the disk 122-6 in the first set of disks 120-1 is an inaccessible disk. Subsequently, it is determined that the stripe 114-2 associated with the disk 122-6 is a faulty strip. For the sake of clarity of description, FIG. 4A and FIGS. 4B and 4C mentioned later do not show all the faulty stripes, but only show the stripe 114-2 as an example. Further, the number of sections of the disk 122-6 included in these faulty stripes may be determined. If the determined number is greater than the number of free sections in the first set of disks 120-1, this means that the number of free sections in the first set of disks 120-1 does not reach the number of sections required for data rebuilding. Subsequently, the stripe allocation operation may be performed across the first set of disks 120-1 and the second set of disks 120-2. Specifically, a new stripe 114-6 may be formed in the second set of disks 120-2. By way of example only, as shown in FIG. 4A, the new stripe 114-6 is formed from the respective section of the disks 122-8, 122-9, 122-10, 122-11, and 122-12 of the second set of disks 120-2. Then, the data in the stripe 114-3 of the first set of disks 120-1 is moved to the new stripe 114-6 of the second set of disks 120-2. Subsequently, the sections of the stripe 114-3 will be released as fee sections. FIG. 4A by way of example shows moving the data on the stripe 114-3 and releasing the stripe 114-3. It may be appreciated that the data in the plurality of stripes may also be moved to the second set of disks 120-2, and correspondingly the released stripes may also be the plurality of stripes to obtain more free sections.

Figure 3:
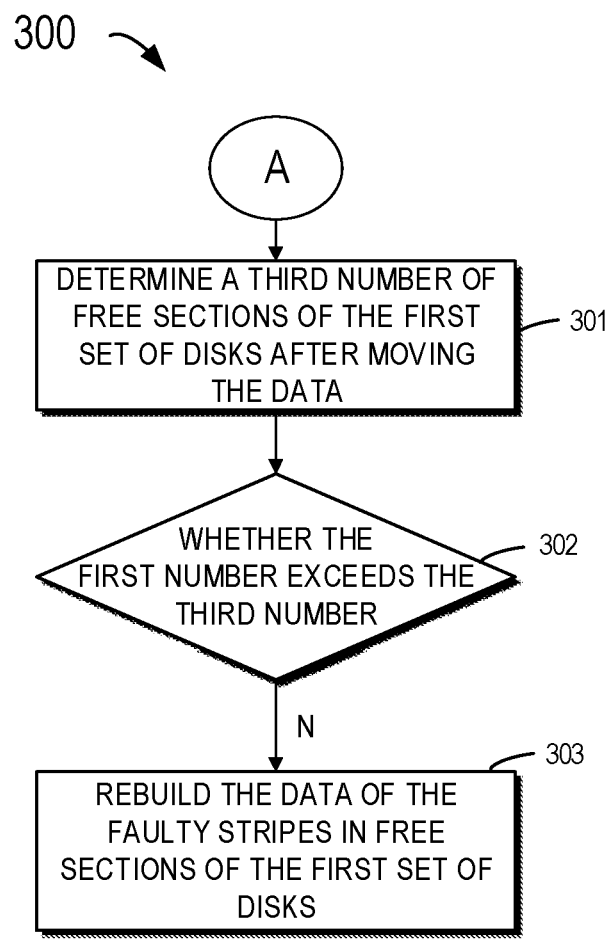
FIG. 3 illustrates a flowchart of a method of performing data rebuilding on a first set of disks after moving data, in accordance with certain embodiments of the present disclosure.
Figure 4B:
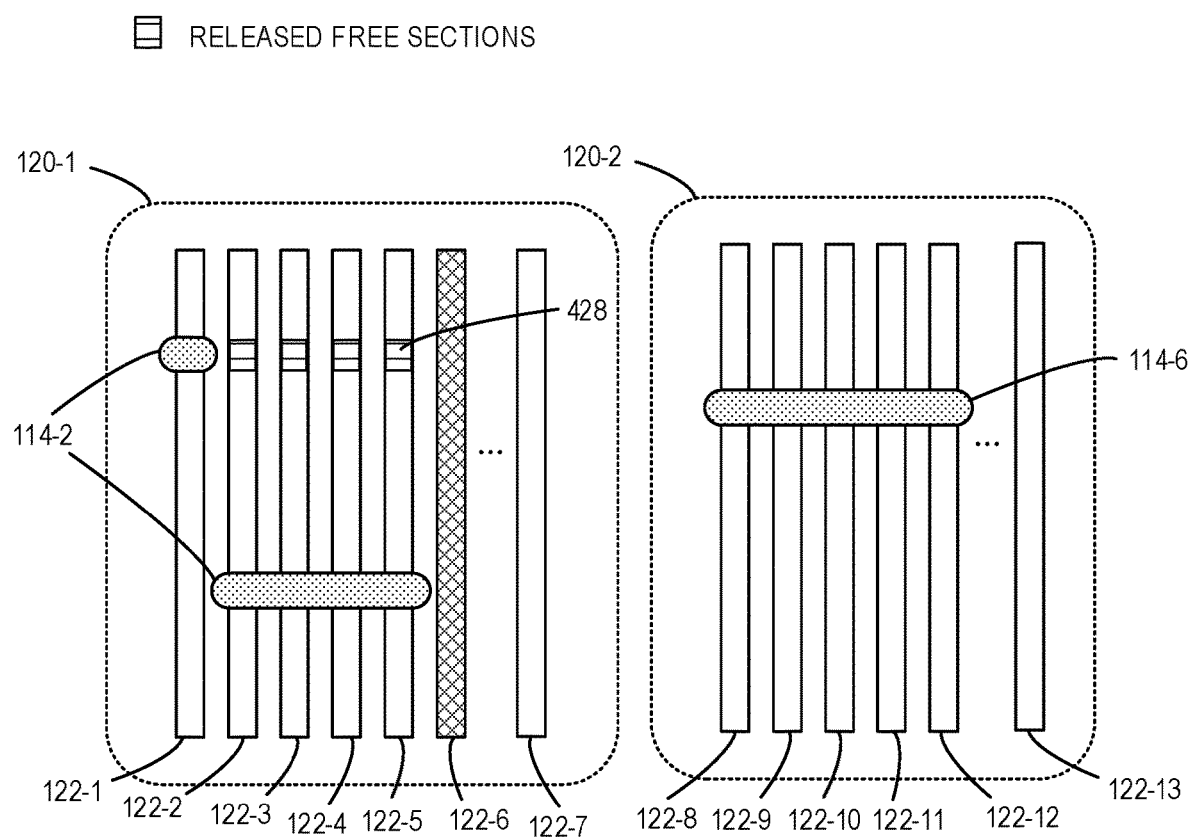
FIG. 4B illustrates a schematic diagram of performing data rebuilding in a first set of disks using the released free sections.

In some embodiments of the present disclosure, after at least one stripe in the first set of disks 120-1 is released, the method 200 may proceed to the method 300 indicated by circle A. Referring to FIG. 3, FIG. 3 illustrates a method 300 of performing data rebuilding on the first set of disks 120-1 after moving data. For purpose of discussion, the method 300 will also be described with reference to FIG. 4B. FIG. 4B illustrates a schematic diagram of performing data rebuilding in the first set of disks 110-1 using the released free sections.

First, method 300 proceeds to block 301. At block 301, a third number of free sections of the first set of disks 120-1 after the data is moved is determined.

Specifically, the data in the stripe 114-3 of the first set of disks 120-1 is completely moved to the stripes 114-6 of the second set of disks 120-2. Thus, the stripe 114-3 releases a plurality of free sections 428. By way of example only, FIG. 4B shows the release of 5 free sections 428 (RAID level is RAID 5). However, the storage system 100 may also employ a RAID at any level, whereby a corresponding number of free sections will be released. FIG. 4B by way of example shows free sections of one stripe which is released. However, it is also possible to move data in a plurality of stripes to the second set of disks 120-2, and correspondingly the released stripes may also be a plurality of stripes to obtain more free sections. These free sections 428 and the original free sections of the first set of disks 120-1 may be used to rebuild lost user data. Thereby, the number of current free sections may be determined again and the number is taken as the third number. Method 300 then proceeds to block 302.

At block 302, it is determined if the first number exceeds a third number. Specifically, it may be determined whether the free section after the movement of the data is sufficient for data rebuilding. If the number of free sections is still insufficient, a restripe operation may continue to be performed between the first set of disks 120-1 and the second set of disks 120-2 to release more free sections in the first set of disks 120-1. If the number of free sections is sufficient, then method 300 proceeds to block 303.

At block 303, the data for the faulty stripes is rebuilt in free sections of the first set of disks 120-1. Specifically, the data in the faulty stripes may be rebuilt in the original free sections and the released new free sections. By way of example only, as shown in FIG. 4B, the data in the faulty stripe 114-2 on the disk 122-6 may be rebuilt on the released respective section of the disk 122-1. In other words, the rebuilt stripe 114-2 may be formed from respective sections of the disks 122-1, 122-2, 122-3, 122-4, and 122-5 of the first set of disks 120-1. FIG. 4B by way of example depicts the rebuilding of the faulty stripe 114-2. It may be appreciated that other faulty stripes not shown in FIG. 4B may also be rebuilt in a similar manner to the faulty stripe 114-2, and the rebuilding of the faulty stripe may also be performed on the original free section, not only on the released section. After the data is rebuilt, the failed disk may be replaced with a new disk, and the restripe operation may be used within the first set of disks 120-1 to balance the storage space allocation of the first set of disks 120-1 so that the data may be immediately stored on the new disk.

Figure 4C:
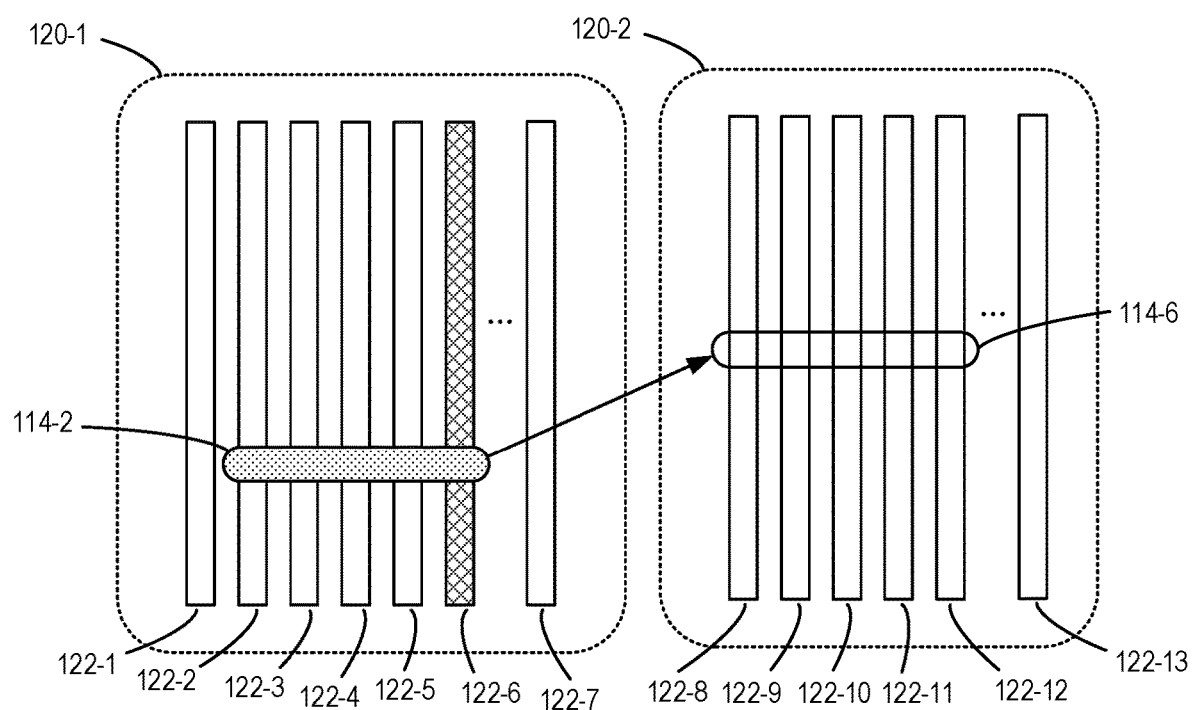
FIG. 4C illustrates a schematic diagram of moving data in a faulty stripe of a first set of disks to a second set of disks.

Returning to FIG. 2, at block 204 of method 200, in some embodiments of the present disclosure, moving data in at least one stripe of the first set of stripes 110-1 to free section of the second set of disks 120-2 of the storage system 100 includes: rebuilding data in the faulty stripe 114-2; and storing the rebuilt data to the free section of the second set of disks 110-2. FIG. 4C shows a schematic diagram of moving data in the faulty stripe 114-3 of the first set of disks 120-1 to the second set of disks 120-2. Description will be made below with reference to FIG. 4C.

In FIG. 4C, the disk 122-6 in the first set of disks 120-1 is detected as an inaccessible disk, and the number of free sections of the first set of disks 120-1 is insufficient for data rebuilding. This is the same as FIG. 4A. At this time, it is necessary to move the data in a portion of the stripes in the first set of disks 120-1 to the second set of disks 120-2. The difference from FIG. 4A is that FIG. 4C preferably choosing to move data on the faulty stripe 114-2. Since the data in the faulty stripe 114-2 on the disk 122-6 has been lost, it is necessary to rebuild the lost data in the faulty stripe 114-2, and then move the rebuilt data in the faulty stripe 114-2 to the new stripe 114-6 of the second set of disks 120-2. Subsequently, the sections of the faulty stripe 114-2 are released and the first set of disks 120-1 obtains 4 new free sections. The released free sections may be used for data rebuilding of other faulty stripes (not shown in FIG. 4C) in the first set of disks 120-1. The process of data rebuilding is similar to that of FIG. 4B, and therefore will not be described again. By moving the data in the faulty strip to another set of disks and releasing the space of the faulty strip, it is possible to provide free sections for the subsequent rebuilding, while also reducing the workload of subsequently performing data rebuilding in the first set of disks 120-1.

Figure 5:
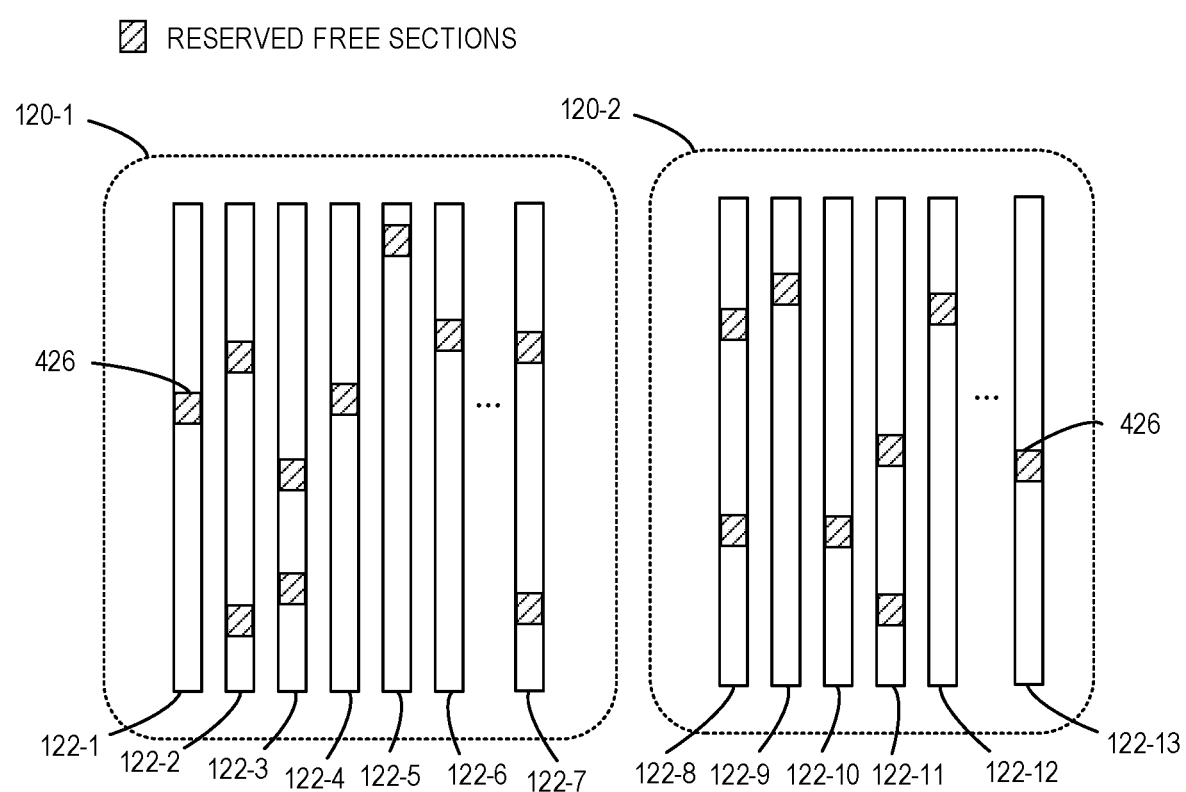
FIG. 5 illustrates a schematic diagram of reserving free sections in the first set of disks and the second set of disks.

In some embodiments of the present disclosure, the method 200 further includes reserving a first set of free sections 426 in the first set of disks 120-1 and reserving a second set of free sections 426 in the second set of disks 120-2. The reserved free sections 426 are dedicated to data rebuilding. FIG. 5 shows a schematic diagram of reserving the free sections 426 on the first set of disks 120-1 and the second set of disks 120-2.

Specifically, some sections may be reserved in the first set of disks 120-1 and the second set of disks 120-2 as spare space. The reserved free sections 426 are spare sections dedicated to data rebuilding, and they are not used to store user data during normal operation. In this way, when an inaccessible disk occurs, it may be ensured that there are enough free sections for rebuilding user data.

In certain embodiments of the present disclosure, the total number of sections in the first set of free sections 426 and the second set of free sections 426 is less than the total number of sections of two disks in the first set of disks 120-1 and the second set of disks 120-2.

As discussed above, since the restripe operation is performed between the two sets of disks 120-1 and 120-2 (i.e., the data in at least stripe of the first set of disks 120-1 is moved to the second set of disks 120-2, and the sections of the at least one stripe are released after moving the data) and the free sections released by the restripe operation are used for data rebuilding or fixing, whereby the first set of free sections 426 reserved in the first set of disks 120-1 and the second set of free sections 426 reserved in the second set of disks 120-2 are actually shared. As a result, it is no longer necessary to respectively reserve sections of one disk in the two sets of disks as a spare space as in the conventional method, but to reserve sections less than sections of two disks in the first set of disks 120-1 and the second set of disks 120-2 as the spare space. The total number of reserved sections of the first set of disks 120-1 and the second set of disks 120-2 as spare space may meet the need as long as it is greater than the number of sections of one disk. However, when there is only one set of disks in the storage system 100, there are no other sets of disks that may share the spare space with the set of disks, and the set of disks still needs to reserve the number of sections of one disk as the spare space.

In some embodiments of the present disclosure, the number of first set of free sections 426 to be reserved in the first set of disks 120-1 is determined based on the number of disks of the first set of disks 120-1; and the number of second set of free sections 426 to be reserved in the second set of disks 120-2 is determined based on the number of disks of the second set of disks 120-2. Specifically, when spare space is reserved for the first set of disks 120-1 and the second set of disks 120-2, sections may be reserved according to the number of disks in the first set of disks 120-1 and the second set of disks 120-2. For example, the first set of disks 120-1 and the second set of disks 120-2 have 24 disks and 6 disks, respectively, and $24/25$ disks may be reserved for the first set of disks 120-1, and $6/25$ disks may be reserved for the second set of disks 120-2. Thus, the total spare space of the two sets of disks is (24+6)/25=1.2 disks. Compared to the conventional method of reserving two disks as spare space, the solution of the present disclosure may save space of 0.8 disks in this example.

The solution of an embodiment of the present disclosure achieves sharing of a spare space or free sections between two sets of disks by performing a restripe operation across two sets of disks and subsequent stripe rebuilding operation. This solution helps to avoid waste of storage space and improve the utilization rate of the storage space. Moreover, embodiments of the present disclosure also help to reduce data movement, obtaining greater efficiency during data rebuilding.

Figure 6:
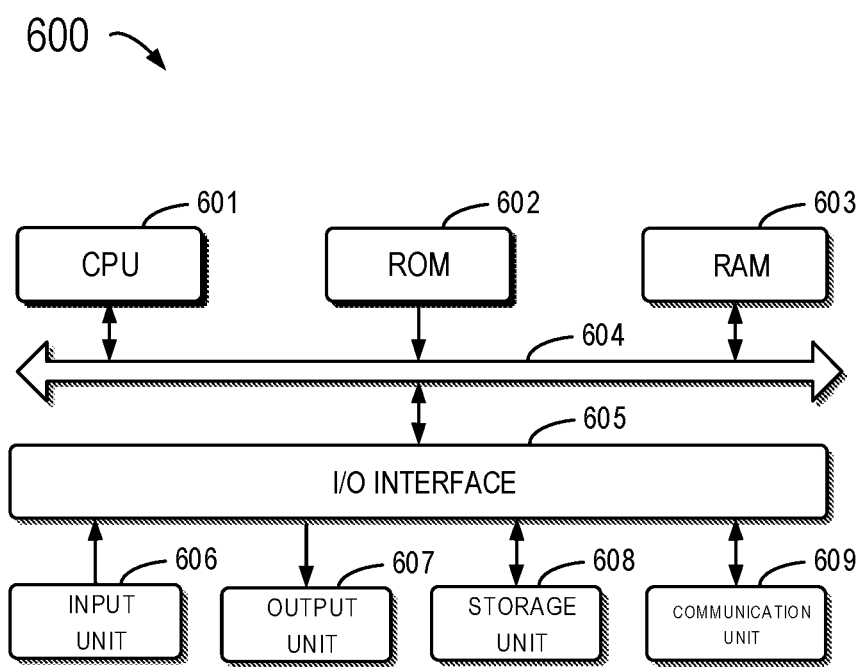
FIG. 6 illustrates a schematic block diagram of an example device that can be used to implement embodiments of the present disclosure.

FIG. 6 illustrates an example block diagram of an example device 600 that can be used to implement an embodiment of the present disclosure. The device 600 may be implemented as including the storage system 100. The device 600 can be used to implement the method 200 or 300 in FIG. 2 or FIG. 3.

As shown, the device 600 includes a central processing unit (CPU) 601 which performs various appropriate acts and processing, based on a computer program instruction stored in a read-only memory (ROM) 602 or a computer program instruction loaded from a storage unit 608 to a random access memory (RAM) 603. The RAM 603 stores therein various programs and data required for operations of the device 600. The CPU 601, the ROM 602 and the RAM 603 are connected via a bus 604 with one another. An input/output (I/O) interface 605 is also connected to the bus 604.

The following components in the device 600 are connected to the I/O interface 605: an input unit 606 such as a keyboard, a mouse and the like; an output unit 607 such as various kinds of displays and a loudspeaker, etc.; a storage unit 608 such as a magnetic disk, an optical disk, and etc.; and a communication unit 609 such as a network card, a modem, and a wireless communication transceiver, etc. The communication unit 609 allows the device 600 to exchange information/data with other devices through a computer network such as the Internet and/or various kinds of telecommunications networks.

The method 200 or 300 described above may be executed by the processing unit 601. For example, in some embodiments, the method 200 or 300 may be implemented as a computer software program or a computer program product that is tangibly included in a machine readable medium, e.g., a non-transient computer readable media such as the storage unit 608. In some embodiments, part or all of the computer programs may be loaded and/or mounted onto the device 600 via ROM 602 and/or communication unit 609. When the computer program is loaded to the RAM 603 and executed by the CPU 601, one or more steps of the method 200 or method 300 as describe above can be executed. Alternatively, in other embodiments, the CPU 601 can be configured in any other appropriate manner (for example, by means of firmware) to execute the method 200 or 300.

Those skilled in the art would appreciate that, each step of the above method according to the present disclosure can be implemented via a general computing device, and they can be integrated on a single computing device or distributed over a network formed by a plurality of computing device. Optionally, they can be implemented by program code executable by a computing device, such that they can be stored on a storage device to be executed by a computing device, or they are produced as various integrated circuit modules, respectively, or a plurality of modules or steps therein is implemented by a single integrated circuit module. As such, the present disclosure is not limited to any particular combination of hardware and software.

It will be noted that although various units or sub-units of the apparatus have been mentioned in the above detailed description, such partitioning is not for limitation. In practice, according to the embodiments of the present invention, the features and functions of two or more units described above may be embodied in one unit. In turn, the features and functions of one unit described above may be further embodied in more units.

Those described above are only optional embodiments of the present disclosure, without limiting the present disclosure, and for those skilled in the art, the present disclosure may allow various modifications and changes. Within the spirits and principles, any amendment, equivalent substitution, improvement and the like shall be all covered within the protection scope of the present disclosure.

We claim:

1. A method for managing disks, comprising:
   detecting whether a first set of disks of a storage system include an inaccessible disk, respective sections of a plurality of disks in the first set of disks forming a first set of stripes;
   in response to detecting that the first set of disks include the inaccessible disk, determining faulty stripes in the first set of stripes, the faulty stripes comprising a first number of sections of the inaccessible disk; and
   in response to the first number exceeding a second number of free sections of the first set of disks, moving data in at least one stripe in the first set of stripes to free sections of a second set of disks of the storage system to release sections of the at least one stripe, respective sections of a plurality of disks in the second set of disks forming a second set of stripes, each stripe in the first set of stripes and the second set of stripes having a same number of sections.

2. The method according to claim 1, wherein moving the data in the at least one stripe to the free sections of the second set of disks comprises:
   rebuilding the data in the faulty stripes; and
   storing the rebuilt data to the free sections of the second set of disks.

3. The method according to claim 1, further comprising:
   determining a third number of free sections of the first set of disks after moving the data; and
   in response to the first number not exceeding the third number, rebuilding the data in the faulty stripes in the free sections of the first set of disks.

4. The method according to claim 1, further comprising:
   reserving a first set of free sections in the first set of disks and reserving a second set of free sections in the second set of disks, the reserved free sections being dedicated to data rebuilding.

5. The method according to claim 4, wherein a total number of sections in the first set of free sections and the second set of free sections is less than a total number of sections of two disks in the first set of disks and the second set of disks.

6. The method according to claim 4 or 5, further comprising:
   determining, based on the number of disks of the first set of disks, the number of the first set of free sections to be reserved in the first set of disks;
   determining, based on the number of disks of the second set of disks, the number of the second set of free sections to be reserved in the second set of disks.

7. The method according to claim 1, wherein determining the faulty stripes in the first set of stripes comprises:
   determining a set of stripes associated with the inaccessible disk; and
   determining stripes stored with user data in the set of stripes as the faulty stripes.

8. The method according to claim 1, wherein moving data in at least one stripe in the first set of stripes to free sections of a second set of disks of the storage system includes:
   identifying a faulty stripe in the first set of stripes;
   rebuilding data corresponding to the faulty stripe;
   storing the data corresponding to the faulty stripe in the free sections of the second set of disks; and
   demapping the faulty stripe.

9. The method according to claim 8, further comprising:
   identifying a set of disks corresponding to the faulty stripe; and
   mapping a new stripe in the first set of disks, wherein a section of the set of disks forms at least part of the new stripe.

10. The method according to claim 9, further comprising:
    identifying a second faulty stripe in the first set of stripes;
    rebuilding the second faulty stripe; and
    storing a set of data related to the second faulty stripe in the new stripe.

11. An electronic device, comprising:
    a processor; and
    a memory coupled to the processor, the memory having instructions stored therein which, when executed by the processor, cause the electronic device to perform acts of:
    detecting whether a first set of disks of a storage system include an inaccessible disk, respective sections of a plurality of disks in the first set of disks forming a first set of stripes;
    in response to detecting that the first set of disks include the inaccessible disk, determining faulty stripes in the first set of stripes, the faulty stripes comprising a first number of sections of the inaccessible disk; and
    in response to the first number exceeding a second number of free sections of the first set of disks, moving data in at least one stripe in the first set of stripes to free sections of a second set of disks of the storage system to release sections of the at least one stripe, respective sections of a plurality of disks in the second set of disks forming a second set of stripes, each stripe in the first set of stripes and the second set of stripes having a same number of sections.

12. The electronic device according to claim 11, wherein moving the data in the at least one stripe to the free sections of the second set of disks comprises:
    rebuilding the data in the faulty stripes; and
    storing the rebuilt data to the free sections of the second set of disks.

13. The electronic device according to claim 11, wherein the acts further comprise:
    determining a third number of free sections of the first set of disks after moving the data; and
    in response to the first number not exceeding the third number, rebuilding the data in the faulty stripes in the free sections of the first set of disks.

14. The electronic device according to claim 11, wherein the acts further comprise:
    reserving a first set of free sections in the first set of disks and reserving a second set of free sections in the second set of disks, the reserved free sections being dedicated to data rebuilding.

15. The electronic device according to claim 14, wherein a total number of sections in the first set of free sections and the second set of free sections is less than a total number of sections of two disks in the first set of disks and the second set of disks.

16. The electronic device according to claim 14 or 15, wherein the acts further comprise:
   determining, based on the number of disks of the first set of disks, the number of the first set of free sections to be reserved in the first set of disks;
   determining, based on the number of disks of the second set of disks, the number of the second set of free sections to be reserved in the second set of disks.

17. The electronic device according to claim 11, wherein determining the faulty stripes in the first set of stripes comprises:
   determining a set of stripes associated with the inaccessible disk; and
   determining stripes stored with user data in the set of stripes as the faulty stripes.

18. A computer program product having a non-transitory computer readable medium which stores a set of instructions to manage disks; the set of instructions, when carried out by computerized circuitry, causing the computerized circuitry to perform a method of:
   detecting whether a first set of disks of a storage system include an inaccessible disk, respective sections of a plurality of disks in the first set of disks forming a first set of stripes;
   in response to detecting that the first set of disks include the inaccessible disk, determining faulty stripes in the first set of stripes, the faulty stripes comprising a first number of sections of the inaccessible disk; and
   in response to the first number exceeding a second number of free sections of the first set of disks, moving data in at least one stripe in the first set of stripes to free sections of a second set of disks of the storage system to release sections of the at least one stripe, respective sections of a plurality of disks in the second set of disks forming a second set of stripes, each stripe in the first set of stripes and the second set of stripes having a same number of sections.

* * * * *